United States Patent [19]

Inada

[11] 3,827,761
[45] Aug. 6, 1974

[54] AUTOMOTIVE ANTISKID DEVICE WITH SAFETY APPARATUS

[75] Inventor: Masami Inada, Toyoake, Japan

[73] Assignee: Aisin Seiki Kabushiki Kaisha, Kariya, Japan

[22] Filed: Sept. 25, 1972

[21] Appl. No.: 292,251

[30] Foreign Application Priority Data
Sept. 25, 1971 Japan.................................. 46-74909

[52] U.S. Cl. ............................ 303/21 AF, 340/52 B
[51] Int. Cl................................................ B60t 8/00
[58] Field of Search............ 73/196, 205 R; 188/1 A; 303/21 AF, 20; 340/52 R, 52 C, 52 B

[56] References Cited
UNITED STATES PATENTS

| | | | |
|---|---|---|---|
| 3,567,290 | 3/1971 | Liggett et al. .................. | 303/21 AF |
| 3,680,923 | 8/1972 | Peterson et al................. | 303/21 AF |
| 3,702,205 | 11/1972 | Arai et al.......................... | 303/20 X |

*Primary Examiner*—Milton Buchler
*Assistant Examiner*—Stephen G. Kunin
*Attorney, Agent, or Firm*—Oblon, Fisher, Spivak, McClelland & Maier

[57] ABSTRACT

An automotive antiskid device having safety apparatus which includes a brake fluid pressure control apparatus disposed within a fluid pressure circuit from a master cylinder to the wheel cylinders and controlling the brake pressure to the wheel cylinders in accordance with a skid signal, fluid pressure detecting apparatus formed upon both sides of the master cylinder and the wheel cylinders, respectively, and operating according to the fluid pressure within the fluid pressure circuit, a safety apparatus automatically operating in accordance with the state of the fluid pressure detecting apparatus, and an electromagnetic fluid pressure cut-off apparatus disposed within the master cylinder and wheel cylinder fluid circuit in parallel with the brake fluid pressure control apparatus and being controlled by the safety apparatus.

2 Claims, 5 Drawing Figures

$P_1, P_2, P_3, P_4, P_5$ $V_2 (V_1)$

AUTOMOTIVE ANTISKID DEVICE WITH SAFETY APPARATUS

BACKGROUND OF THE INVENTION

This invention relates generally to vehicle brake systems and more particularly to vehicle brake systems having anti-skid controls therein.

Conventional brake systems are normally fitted with various brake pressure control means between the master cylinder and the wheel cylinders, such as, for example, a brake pressure proportioning valve for, distributing the brake pressures to the front and rear wheels at almost the same ratio as the ratio of the load acting upon an anti-skid control device for preventing wheel lock of all the wheels, and for improving the brake performance. However, such a brake control system is also normally provided with a fluid pressure control valve especially a fluid pressure cut-off valve for limiting, to a certain extent, the brake pressure being transmitted to the wheel cylinders, and if this brake pressure control device should become damaged, it is feared that sufficient brake pressure will not be delivered to the wheel cylinders. Naturally, this deficiency is considered to be greatly disadvantageous in practice.

SUMMARY OF THE INVENTION

Accordingly, it is an object of the present invention to provide an improved safety means upon a brake control system adapted for obviating the aforementioned drawbacks of conventional systems.

Another object of the present invention is to provide an improved safety means capable of obtaining safe brake actuation even if a cut-off valve of an anti-skid device becomes damaged.

Still another object of the present invention is to provide an improved safety means which exercises no influence over the brake control device, particularly an anti-skid device, under normal brake actuation.

Yet another object of the present invention is to provide an improved safety means capable of normally actuating the brake pressure even when the voltage of the electric power is broken and the brake control device is damaged whereby fluid pressure is not normally applied to the wheel brake cylinders.

The foregoing and other objects are attained according to this invention through the provision of a safety means which automatically detects that state in which the brake pressure is not normally delivered to the wheel cylinders and which is capable of restoring the brake pressure to its normal condition, such being accomplished by means of an electromagnetic operation.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE ILLUSTRATED EMBODIMENTS

Figure 1:
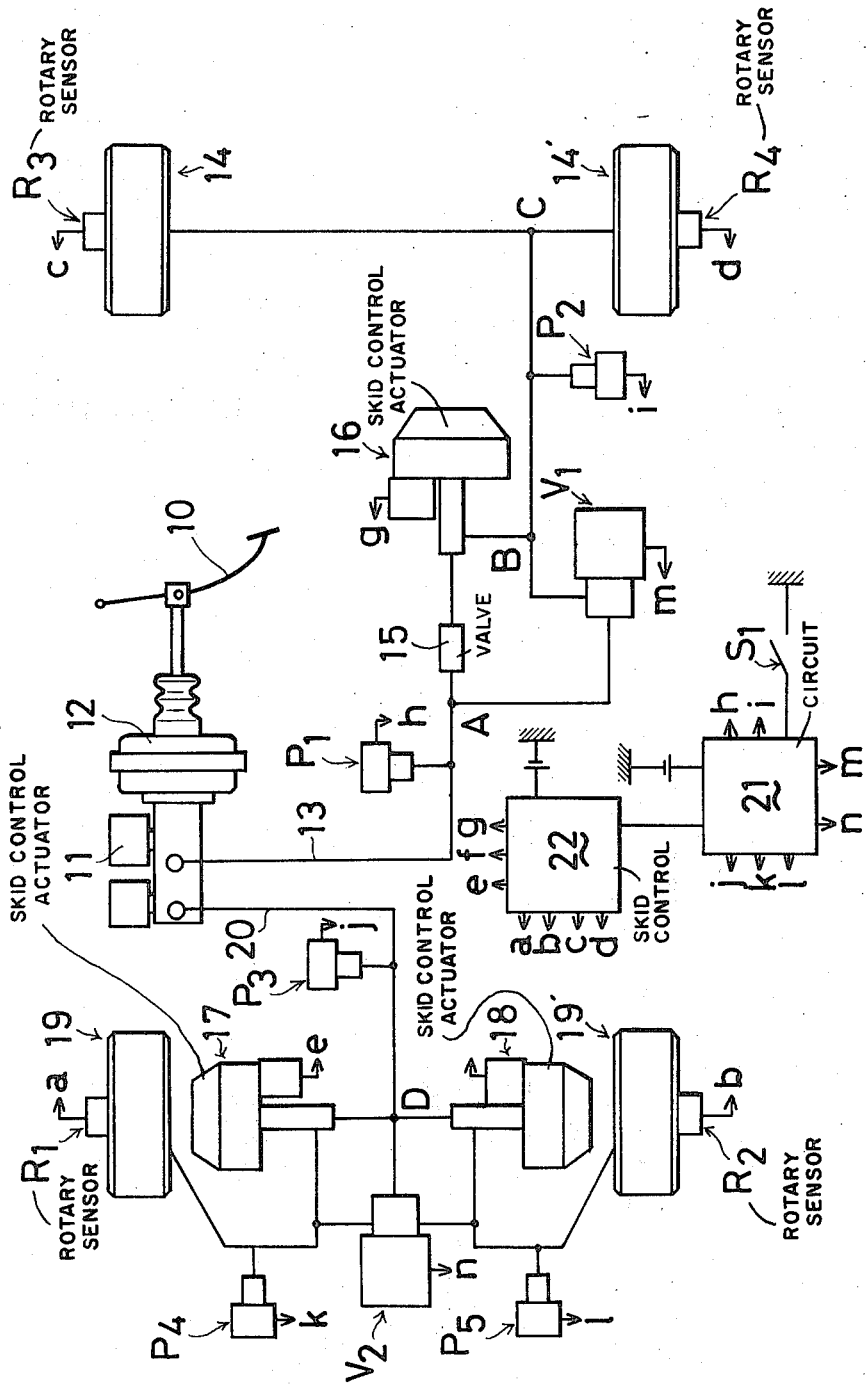
FIG. 1 is a schematic view of the brake fluid pressure and electronic components of the safety device of the brake control system constructed according to this invention.

Referring now to the drawings, and more particularly to FIG. 1 thereof, a brake pedal 10 is provided for actuation by a vehicle driver, while a tandem master cylinder 11 is in series connection with a brake booster 12, the latter being connected to pedal 10. A rear wheel fluid-pressure circuit 13 joins tandem master cylinder 11 to rear wheels 14 and 14' through a proportioning valve 15 and a skid control actuator 16 for use in connection with rear wheels 14 and 14'. A pressure switch $P_1$ is provided between the tandem master cylinder 11 and the proportioning valve 15. An electromagnetic actuating fluid-pressure changeover valve $V_1$ is similarly disposed between diverging points A and B of the fluid pressure circuit 13 while a pressure switch $P_2$ is disposed between points B and C.

Two skid control actuators 17 and 18 for use in conjunction with the front wheels 19 and 19' are provided in a front wheel fluid-pressure circuit 20. A pressure switch $P_3$ is disposed between the master cylinder 11 and a diverging point D of the fluid pressure circuit 20, while pressure switches $P_4$ and $P_5$ are respectively provided between the actuators 17 and 18 and the front wheels 19 and 19'. An electromagnetic actuating fluid-pressure changeover valve $V_2$, similar to valve $V_1$, is disposed between point D and the respective pressure switches $P_4$ and $P_5$. Rotary sensors $R_1$, $R_2$, $R_3$ and $R_4$ are provided for use upon the front and rear wheels 19 and 19', and 14 and 14' respectively, the sensors detecting the rotational speed of the wheels. An electronic circuit of the safety device is generally indicated by the reference character 21 while a skid control electronic device 22 and a key switch $S_1$ are also provided. Various input and output terminals a-n lead to the various components of the electronic circuitry.

Figure 2:
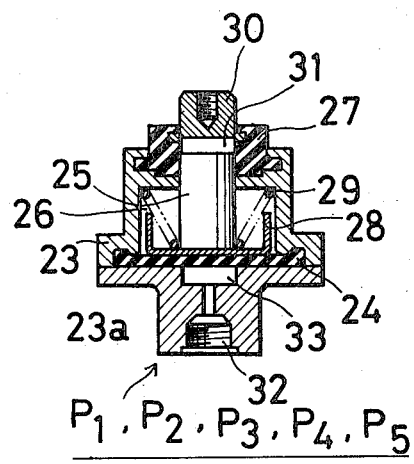
FIG. 2 is a vertical sectional view of a pressure switch utilized in the brake control system of the invention disclosed in FIG. 1.

Referring now to FIG. 2, each of the pressure switches $P_1$, $P_2$, $P_3$, $P_4$ and $P_5$ is identical in construction, any one of which is composed of a body portion 23, of electrically conductive material, and a casing 23a, the body 23 and the casing 23a having disposed therebetween in air-tight sealed fashion, the peripheral portion of a diaphragm 24, body 23 and casing 23a being secured together by means of a screw, not shown. An actuating plunger 25 is slidably inserted in air-tight sealed fashion, within a chamber 26, the plunger 25 extending from the upper end of the body 23 through a substantially annular insulating member 27 to the lower end of the body 23 where it is connected with the diaphragm 24 via a retainer 28. A return spring 29 is interposed between the upper end of the body 23 and the retainer 28 and normally acts for urging the diaphragm 24 downwardly as seen in FIG. 2. The upper exposed portion of the plunger 25 is provided with an electric terminal connecting part 30 having a gap 31 disposed between part 30 and the body portion of plunger 25. A port 32 leads to a chamber 33 disposed below diaphragm 24, port 32 being axially aligned with plunger 25.

Still referring to FIG. 2, the non-pressure state is shown, wherein the retainer 28 and the plunger 25 are capable of moving incorporating and are normally depressed in the downward direction by the spring 29, so that no electric contact between plunger 25 and port 30 is made. When pressure which exceeds a prescribed value, is, however, supplied to the chamber 33, the plunger 25 is forced upwardly against the coil spring 29 by the fluid pressure acting upon the diaphragm 24, whereby the electric terminal connecting part 30 and the plunger 25 come into contact and the plus voltage applied to the electric terminal connecting part 30 flows to ground via the plunger 25, the spring 29 and the body 23, the plunger 25, thus being in a current passing state. In other words, the pressure switches $P_1 - P_5$ are off when the pressure is less than the prescribed value, and vice versa.

Figure 3:
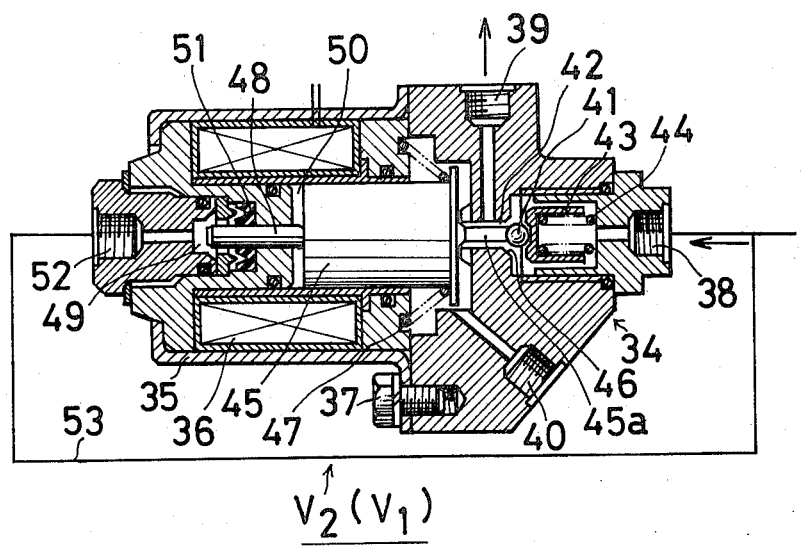
FIG. 3 is a view similar to FIG. 2, illustrating however, an electromagnetic actuating fluid pressure changeover valve utilized in the brake control system of the invention disclosed in FIG. 1.

Referring now to FIG. 3, the constitution of the electromagnetic actuating fluid-pressure changeover valves $V_1$ and $V_2$ will be described hereinbelow in detail. A main body, generally indicated by the reference character 34, has a casing 35 for housing a solenoid coil 36 secured thereto by bolts 37. An inlet port 38 is provided in the main body 34 for receiving fluid pressure from the master cylinder 11, while outlet ports 39 and 40 are provided for conducting the fluid pressure to the wheel cylinders, not shown. Upon actuation of valve $V_1$, the fluid communication between port 38 and port 39 is interrupted by a ball valve 41. The ball valve 41 is utilized for opening or closing a passage 42 and a valve retainer 43 is utilized for accommodating the valve 41 and for retaining a coil spring 44. A plunger 45 and a right-end small diameter land member 45a normally keep the ball valve 41 separated from its seat 46 which is formed upon the main body 34. A coil spring 47 normally urges the plunger 45 toward the right as seen in FIG. 3, while both ends of a balance piston 48 project into side chambers 49 and 50 of a seal 51, the right end of the balance piston 48 being in contact with the left end of plunger 45. An inlet port 52 is provided for inducing the balanced fluid pressure to the chamber 49 while a balance fluid pressure circuit 53 connects ports 52 and 38.

Still referring to FIG. 3, the valves $V_1$ and $V_2$ are in their non-actuated state, wherein no current passes into the solenoid coil 36, the plunger 45 is depressed toward the right by the spring 47, the ball valve 41 is separated from its seat 46, and the ports 38, 39 and 40 are respectively connected, whereby the fluid pressure forwarded from the master cylinder is able to be delivered directly to the wheel cylinders through these valves $V_1$ and $V_2$. When however, the solenoid coil 36 is energized, the ball valve 41 becomes seated upon the seat 46 whereby the passage 42 is closed, so that control of the fluid pressure from the master cylinder 11 to the wheel cylinders through the valve 41 becomes impossible. However, as the cross-sectional area of the balance piston 48 is of the same diameter as that of the seat cross-sectional area of the ball valve 41, if a positive fluid pressure difference occurs upon the sides of ports 38, 39 and 40, the ball valve 41 is capable of opening the ports 38, 39 and 40 against the force of the spring 44 regardless of the initial pressure difference.

Figure 4:
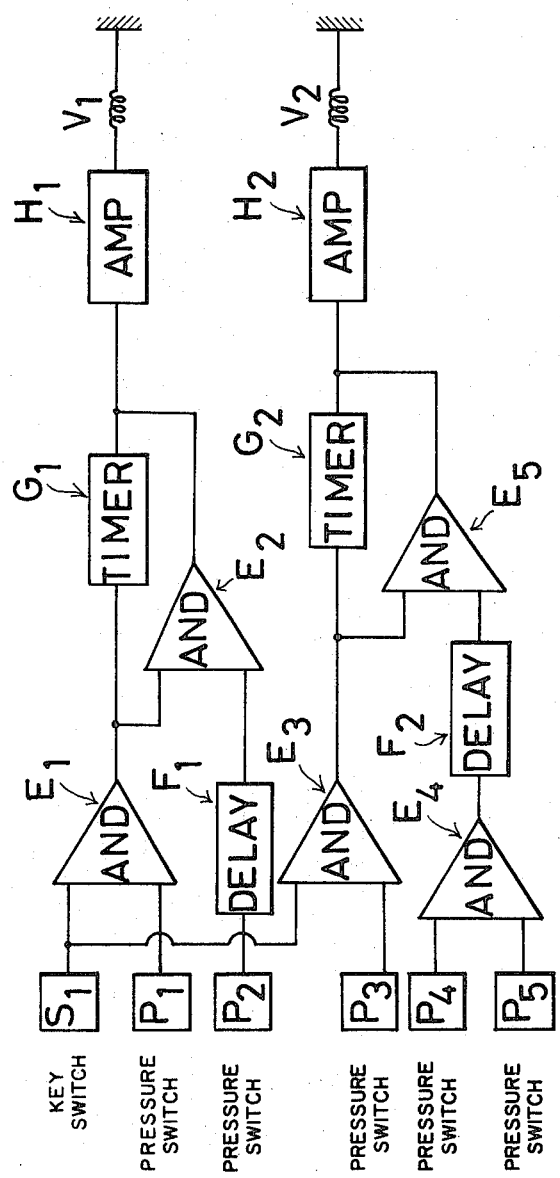
FIG. 4 is a block flow diagram showing the various components for controlling the actuation of the safety device of the present invention.

Referring now to FIG. 4, $S_1$ is the key switch shown in FIG. 1 and such is kept in the on position, in cooperation with an accessory switch, not shown, during normal driving of the vehicle. $P_1 - P_5$ are the pressure switches as shown in FIGS. 1 and 2, while $E_1, E_2, E_3, E_4$ and $E_5$ are well-known AND elements, and only when both the left-side inputs are in the on-state, then will the right-side inputs issue an on-signal. The numerals $F_1$ and $F_2$ are time lag elements which actuate upon there being a change from the on-state to the off-state. The timing elements $G_1$ and $G_2$ maintain the on-state only for a prescribed period after the input is changed from the off-state to the on-state, and thereafter the timing elements $G_1$ and $G_2$ are operated so as to be in the off-state regardless of the input. Amplification elements $H_1$ and $H_2$ amplify the inputs and drive the valves $V_1$ and $V_2$.

Figure 5:
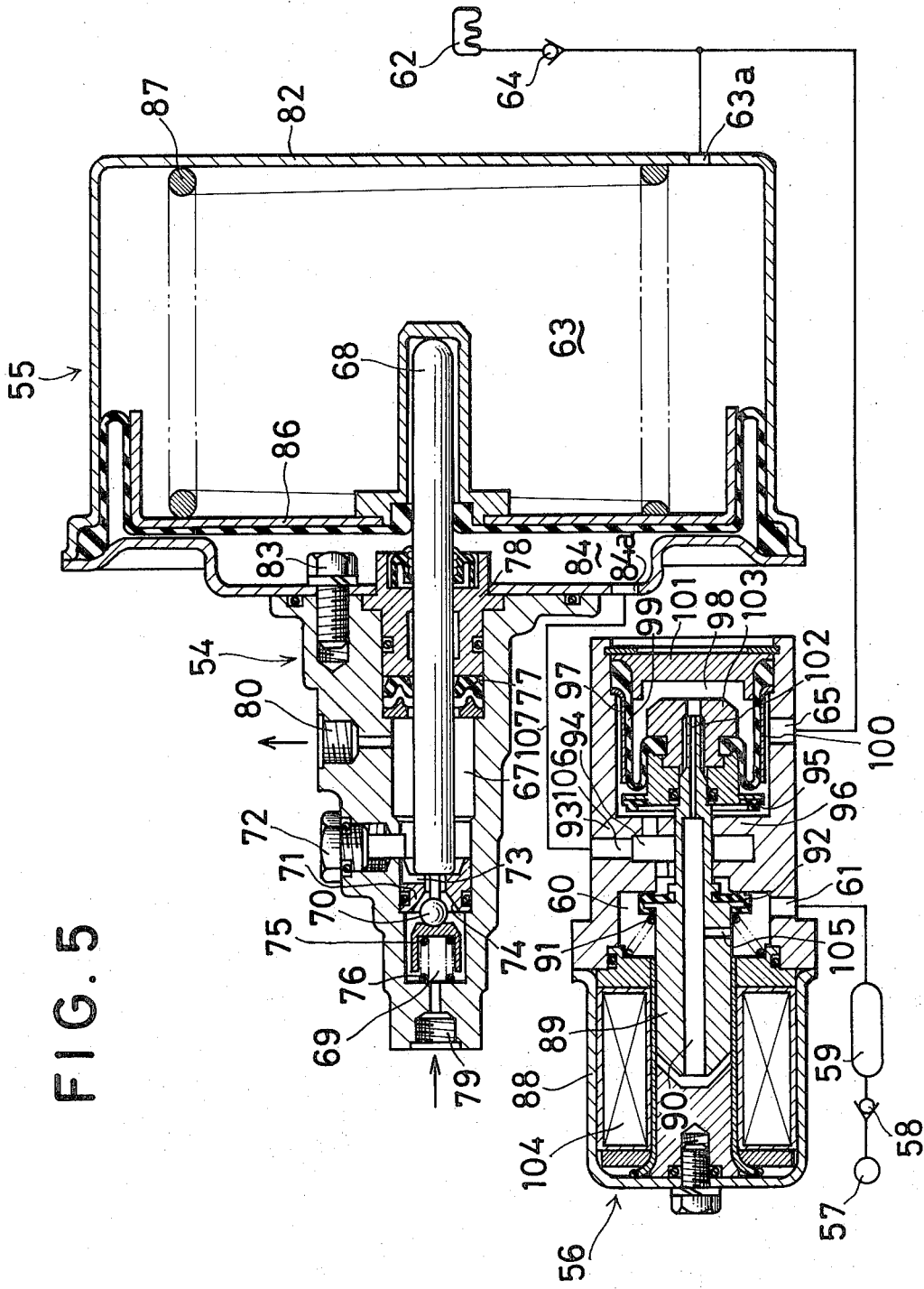
FIG. 5 is a view similar to FIG. 3, illustrating however, an actuator of the skid control device of the present invention.

Referring now to FIG. 5, the constitution of an electromagnetic air-changeover valve of an actuator device and the skid control device will now be described hereinbelow in detail. The anti-skid fluid pressure control system mainly comprises a fluid pressure control part 54, a servo means 55, and an air changeover valve generally indicated by reference character 56 for actuating the servo means 55. A compressor 57 is fluidically connected with a check valve 58, an accumulator or tank 59, and a chamber 60 of the air changeover valve 56 via a port 61. An intake manifold 62 is connected with a chamber 63 of the servo means 55 via a check valve 64 and a port 63a, and is further connected with a port 65 of valve 56 through a pipe 66.

The fluid pressure control part 54 comprises a pressure chamber 67 for slidably moving a plunger 68 and a valve actuating chamber 69 being operated by a ball valve 70. A valve seat member 71 is provided for seating the ball valve 70, the valve seat member 71 being stopped by a stopper 72. A notch groove 73 is formed upon the seat member 71 and serves as a passage for fluid pressure. A valve seat surface 74 is provided whereupon the valve 70 is seated, while a retainer 75 guides the valve 70 and also constitutes the seat of a coil spring 76. An annular seal 77 surrounds the plunger 68 and a guide member 78 retains the plunger 68 during its reciprocal movement. An inlet port 79 is provided at the left end of control part 54 while an outlet port 80 extends in the radial direction from control part 54.

The servo means 55 comprises casings 81 and 82 which are fixed to the fluid pressure control part 54, in air-tight sealed fashion by means of a bolt 83. The housing composed within the casings 81 and 82 is likewise air-tight, and is divided into a narrow chamber 84 and a larger, wider chamber 63 by means of a diaphragm 85, a power piston 86, and a return coil spring 87 disposed within the chamber 63 and which normally urges the power system 86 toward the left as seen in FIG. 5. The power piston 86 is operatively connected with the right end of the plunger 68.

The air changeover valve 56 comprises a main body 88, and an actuating plunger 89, having an axial passageway 90, slidably mounted within the body 88, the plunger 89 being normally urged toward the right by means of a coil spring 91. A first valve 92 fixed to the plunger 89 is normally seated upon a valve seat 93 and serves to cut off the fluid connection between the chamber 60 and an annular chamber 94. A second valve 95 fixed to the right end of the plunger 89 is shown unseated from its valve seat 96 and serves to connect the chamber 94 with a chamber 97. An interior chamber 98 is formed by a diaphragm 99 and retainers 100 and 101, chambers 98 and 97 being sealed off from each other by means of the diaphragm 99, although chamber 98 is connected to through passage 90 via an axial passageway 102. A plug 103 fixes the inner periphery of the diaphragm 99 to the plunger 89 and is secured upon the valve 95. An annular solenoid coil 104 surrounds the left end of plunger 89, while a port 105 fluidically connects passageway 90 with chamber 60. Similarly, a radially extending port 106 is connected to chamber 94 at one end and fluid conduit 107 at its other end, conduit 107 leading to port 84a of servo 55.

In the off-state of the engine key $S_1$, even if an input is entered into the pressure switches $P_1$ and $P_2$, the AND elements $E_1$ and $E_3$ won't produce an output and the changeover valves $V_1$ and $V_2$ will be in the non-actuating state. Therefore, even if the fluid connection is cut off by damage to the anti-skid devices 15, 16, 17 and 18, the transmission of the fluid pressure from the master cylinder to each wheel through valves $V_1$ and $V_2$ is practicable.

Next, upon actuating the brake, the pressure switches $P_1$ and $P_3$ are in the on-state per the braking operation, so the AND elements $E_1$ and $E_3$ issue on-signals from the output terminals. At this time valves $V_1$ and $V_2$ are driven for further transmitting the on-signals that were transmitted to the amplification elements $H_1$ and $H_2$ by operation of the timing elements $G_1$ and $G_2$ for a given period of time.

Thereupon, if the brake system is in the state of being normally capable of transmitting the fluid pressure, the pressure switches $P_2$, $P_4$ and $P_5$ are in the on-state and thus, on signals are communicated to the AND elements $E_2$ and $E_5$ via the lag elements $F_1$ and $F_2$ and the output terminals of the AND elements $E_2$ and $E_5$ are on, so that on-signals are being continuously delivered to the amplification elements $H_1$ and $H_2$. Accordingly, valves $V_1$ and $V_2$ are in the on-state, so the brake control device is normally capable of performing the braking function.

When conveyance of fluid pressure is impossible because of a breakdown in the brake control device, the pressure switches $P_1$ and $P_3$ are in the on-state per the braking operation, and hence, the AND elements $E_1$ and $E_3$ give on-signals from the input terminals. At this moment the on-signals are imparted to the amplification elements $H_1$ and $H_2$ by the operation of the timing elements $G_1$ and $G_2$ for a fixed period of time, and consequently the valves $V_1$ and $V_2$ keep the wheels in the driving state for this period of time. When the fluid pressure control device of the anti-skid control system is not regularly communicated with the fluid pressure, the pressure switches $P_2$, $P_4$ and $P_5$ maintain the off-state, so that outputs of the AND elements $E_2$ and $E_5$ are not produced and the valves $V_1$ and $V_2$ maintain the driving state for abovementioned fixed period of time, after which the valves $V_1$ and $V_2$ return to their non-actuating state. Accordingly, at this point the fluid pressure is delivered to each wheel cylinder through the valves $V_1$ and $V_2$ and the normal braking actuation is obtained.

Upon normal braking, when the anti-skid is operated, the pressure switches $P_2$, $P_4$ and $P_5$ repeat the on or off-state, however the on-signal is continually conveyed to the AND elements $E_2$ and $E_5$ upon actuation of the anti-skid device, so that the valves $V_1$ and $V_2$ maintain the off-state.

Further, when the anti-skid device is operated, the solenoid 104 (see FIG. 5) is energized and the plunger 89 is moved toward the left against the force of the spring 91 and the valve 92 separates from the seat 93, and similarly, the valve 95 is seated upon the seat 96, the high pressure of the tank 59 therefore being transmitted to the chamber 84 of the servo means 55 through the two chambers 60 and 94, and since the chamber 63 is kept in the vacuum state, the power piston 86 is moved toward the right against the spring 87 by the great pressure difference between the two chambers 63 and 84. Similarly, the plunger 68 is moved toward the right by the fluid pressure within the chamber 69, and hence the valve 70 is seated upon the seat 74 and the connection between the chambers 69 and 67 is terminated. Moreover, when the plunger 68 is moved toward the right the capacity of the chamber 67 is increased and the fluid pressure of the brake to each wheel cylinder, not shown, is decreased, so that locking of the wheels cannot occur. Thereby, the solenoid 104 is not energized and the plunger 89 is moved toward the right by operation of the spring 91 and the plunger 89 is returned to the state as viewed in FIG. 5, the chamber 84 of the servo means 55 returns to its non-connected state with the positive pressure of the tank 59 and to its connected state with the negative pressure thereof, so the power piston 86 is moved towards the left by operation of the spring 87, and the plunger 68 reduces the volume of the chamber 67 and the brake pressure is increased, and the power piston 86 is moved further toward the left whereby the plunger 68 moves the ball valve 70 and the master cylinder 55 is again connected to each wheel cylinder and normal braking action is again attained.

Obviously, many changes and modifications of the present invention are possible in light of the foregoing teachings. It is to be understood, therefore, that within the scope of the appended claims, the invention may be practiced otherwise than as specifically described herein.

What is claimed as new and desired to be secured by letters patent of the United States is:

1. An apparatus for antiskid brake pressure control in a hydraulic wheel brake system of an automotive vehicle with wheels, comprising in combination of:
   a master brake cylinder;
   a plurality of brake wheel cylinders for fluid connection with said master cylinder;
   a plurality of sensors for detecting the number of rotations of said wheels;
   an antiskid fluid pressure control means disposed within a first fluid pressure circuit between said master cylinder and said wheel cylinders and controlling the brake pressure to said wheel cylinders responsive to a signal from said sensors;
   fluid pressure responsive switching means disposed within said master cylinder and said wheel cylinders and operating according to the fluid pressure within said circuit;

safety means automatically actuated in accordance with the state of said fluid pressure responsive switching means; and electromagnetic fluid pressure cut-off means disposed within a second fluid circuit between said master cylinder and said wheel cylinders and operating according to said fluid pressure responsive switching means and being controlled by said safety means, whereby the normal braking actuation is obtained in the event of a breakdown in said antiskid fluid pressure control means.

2. Apparatus as set forth in claim 1, wherein said safety means comprises in combination:

an accessory switch of said vehicle;

a key switch maintaining the on-state in cooperation with said accessory switch during vehicle driving;

a plurality of AND elements issuing an output only when two inputs issue an on-state;

a plurality of delay elements operating only when an input is switched from an on-state to an off-state;

a plurality of timing elements for maintaining said on-state for a prescribed time after said input is changed from an off-state to an on-state and thereafter operating for maintaining said off-state without regard to said input; and a plurality of amplification elements for amplifying said inputs and driving said electromagnetic fluid pressure cut-off means.

* * * * *